United States Patent [19]

Straub et al.

[11] Patent Number: 5,430,878
[45] Date of Patent: Jul. 4, 1995

[54] METHOD FOR REVISING A PROGRAM TO OBTAIN COMPATIBILITY WITH A COMPUTER CONFIGURATION

[75] Inventors: Eric Straub, Kirkland; Mike Dryfoos, Bothell, both of Wash.

[73] Assignee: Microsoft Corporation, Redmond, Wash.

[21] Appl. No.: 240,539

[22] Filed: May 10, 1994

Related U.S. Application Data

[63] Continuation of Ser. No. 847,525, Mar. 6, 1992, abandoned.

[51] Int. Cl.⁶ .......................... G06F 9/44; G06F 11/10
[52] U.S. Cl. ...................... 395/700; 395/500; 364/DIG. 1; 364/280; 364/286; 364/286.4; 364/286.5
[58] Field of Search .......................... 395/650, 700, 500

[56] References Cited

U.S. PATENT DOCUMENTS

| | | | |
|---|---|---|---|
| 5,111,390 | 5/1992 | Ketcham | 395/725 |
| 5,133,063 | 7/1992 | Naito et al. | 395/500 |
| 5,150,474 | 9/1992 | Kaneko | 395/500 |
| 5,155,827 | 10/1992 | Ghering | 395/425 |
| 5,179,703 | 1/1993 | Evans | 395/700 |
| 5,212,633 | 5/1993 | Franzmeier | 395/500 |
| 5,251,314 | 10/1993 | Williams | 395/600 |
| 5,274,815 | 12/1993 | Trissel et al. | 395/700 |
| 5,297,282 | 3/1994 | Meilak et al. | 395/700 |

FOREIGN PATENT DOCUMENTS

0275448 7/1988 European Pat. Off. .
63-0118466 5/1988 Japan .

OTHER PUBLICATIONS

W. Brooks, "Leaving 640 KB Behind"; PC Tech Journal; vol. 7, No. 4, Apr., 1989; pp. 34–45; and Abstract.

Primary Examiner—Kevin A. Kriess
Attorney, Agent, or Firm—Seed and Berry

[57] ABSTRACT

A program is stored in the memory of a computer to create an image of the program. The image of the program is examined for information indicating whether the program is compatible with the configuration of the computer. If necessary, the image of the program is revised so that the program will operate properly with the configuration of the computer. In a first embodiment of the invention, information identifying a configuration of a computer system with which the program is compatible is associated with the image of the program. In a second embodiment of the invention, a predetermined set of instructions and data are replaced with alternate instructions and data.

14 Claims, 3 Drawing Sheets

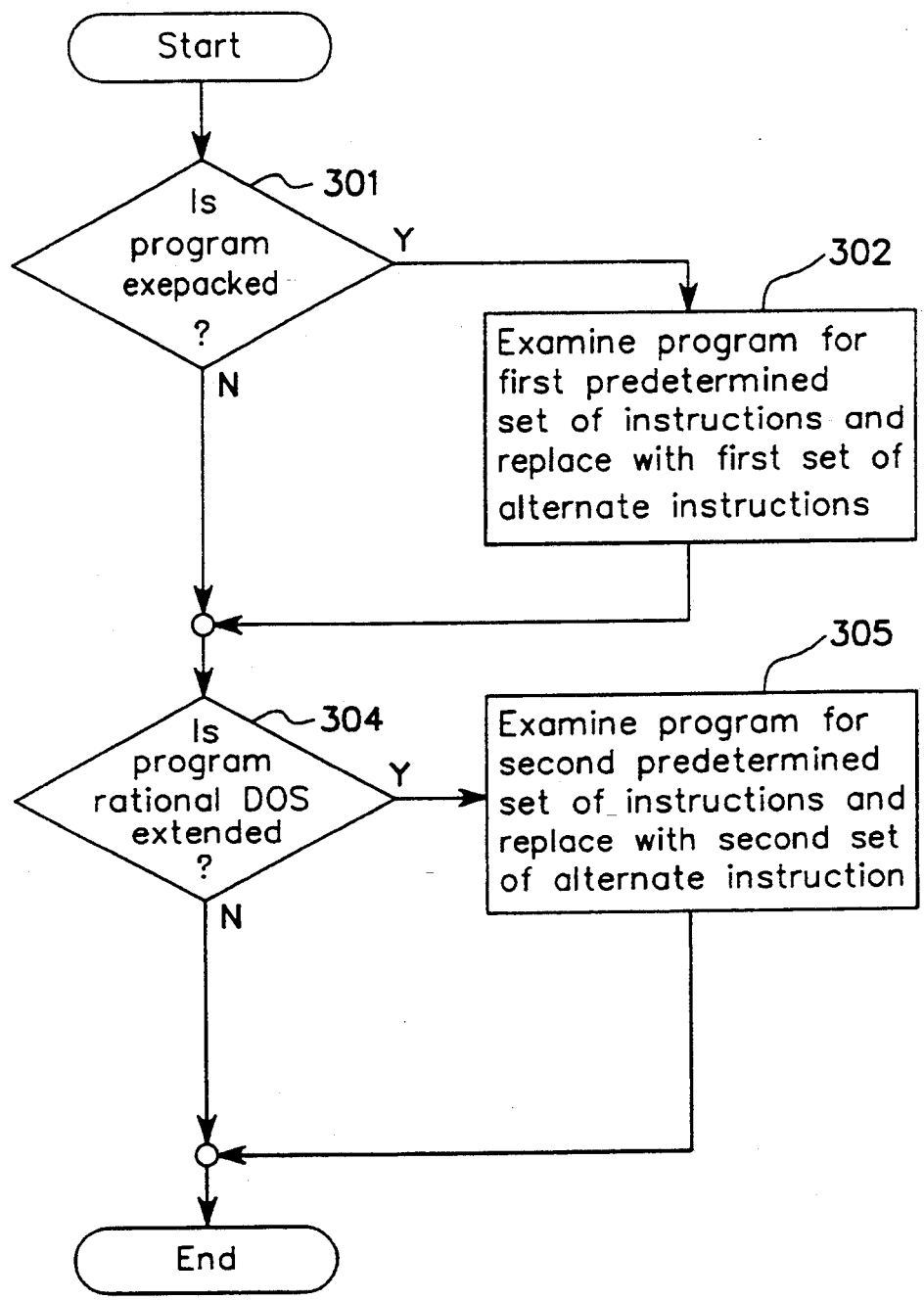

METHOD FOR REVISING A PROGRAM TO OBTAIN COMPATIBILITY WITH A COMPUTER CONFIGURATION

CROSS-REFERENCE TO RELATED APPLICATION

This application is a continuation of U.S. patent application Ser. No. 07/847,525, filed Mar. 6, 1992, now abandoned.

TECHNICAL FIELD OF THE INVENTION

The present invention is directed toward a method for storing programs in personal computer memory and, more particularly, is directed toward a method for storing programs in the lowest available region of a personal computer memory.

BACKGROUND OF THE INVENTION

Application programs that are executed by a personal computer are typically stored in the conventional memory region of the computer's memory space. Since the designers of the programs expect these programs to be stored in the conventional memory region, they have been designed to be executed from this region. For this reason, some of these programs are not capable of being operated from the lowest available memory region of the computer memory.

As an example, commercially available application programs designed to be executed by a personal computer are typically stored in a manner to minimize the amount of non-volatile media necessary to contain the application program. One manner of storing these application programs to minimize the amount of fixed storage medium necessary to contain the application program is to operate upon the application program with a storage maximization program. One such storage maximization program, referred to as EXEPACK, converts the application program from one form to another equivalent form, wherein the equivalent form takes less storage space. However, in certain computer configurations, a program that has been EXEPACKed does not operate properly if it is loaded in the lowest available region of the computer's memory space.

As another example, programs that use the Rational DOS Extender do not operate properly when they are loaded in the lowest available region of the computer's memory space. Accordingly, it is desirable to provide a method for loading programs from a fixed storage medium to the computer's memory space wherein the programs can be loaded in substantially any region of the computer's memory space.

Along these lines, many programs rely upon a version number of the operating system to determine whether the program is compatible with the operating system, i.e., whether the program is capable of being properly executed using the operating system of the personal computer. However, a program that was written prior to the existence of a new operating system, or prior to the existence of a new version of an old operating system, may not recognize that it is compatible with the new or revised operating system by the version number. Accordingly, to be able to run the program with the new operating system, the program must be revised so that it will recognize the new operating system. Accordingly, it is desirable to provide a method for loading a program into computer memory and revising a program to indicate that it is operable with the operating system associated with the computer memory.

SUMMARY OF THE INVENTION

The present invention provides a method for storing a program into a computer for execution wherein the computer includes a computer memory and wherein the computer has a predetermined configuration. The method includes the step of reading the program from a fixed storage medium and storing an image of the program into the computer memory. The method further includes the step of examining at least a portion of the image of the program for information indicating the compatibility of the program with the configuration of the computer and revising the image of the program to enable the program to operate properly with the predetermined configuration of the computer.

In a first embodiment of the invention, the program includes a program name. The step of examining at least a portion of the image of the program further includes the steps of storing a table of program names and associated computer system identifiers in the computer memory. Also, the step of examining at least a portion of the image of the program includes the substep of referencing the table of program names for the associated computer system identifier, and storing the associated computer system identifier in a storage region associated with the image of the program.

In a second embodiment of the invention, the step of examining at least a portion of the program comprises the substep of examining the set of instructions of the image of the program to determine whether the image of the program contains a predetermined set of program instructions and, if so, replacing the predetermined set of program instructions with a set of alternate instructions.

BRIEF DESCRIPTION OF THE DRAWINGS

FIG. 3 is a decision flow diagram of a method for patching programs.

DETAILED DESCRIPTION OF THE INVENTION

Figure 1:
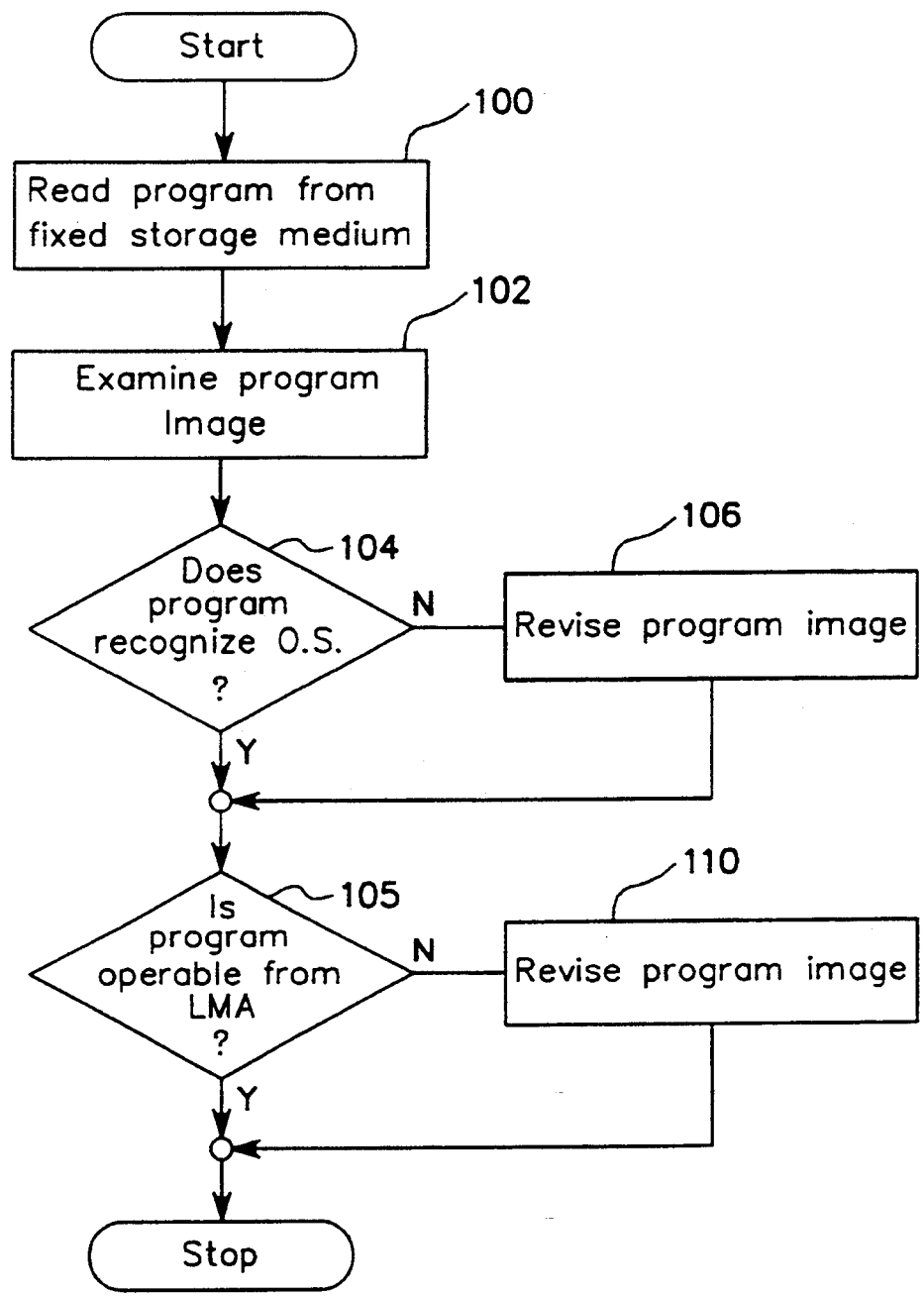
FIG. 1 is a decision flow diagram illustrating the method of the subject invention.

The present invention provides a method for storing a program into the memory of a personal computer. As is known in the art, personal computers typically include a computer memory space defined in large measure by the addresses that the personal computer is capable of accessing. This computer memory space is typically Random Access Memory (RAM) or other similar memory capable of being quickly accessed by the personal computer.

Within the computer's memory space is typically stored an operating system for interfacing application programs with the hardware of the personal computer. In one embodiment of the invention, the personal computer includes the DOS operating system. However, the method of the subject invention is equally applicable with personal computers configured with other operating systems. Similarly, although the invention is described herein by reference to a personal computer, those skilled in the art will recognize that the invention is equally applicable to other computer systems. An example of a computer system capable of being used with the subject invention is described in U.S. patent application Ser. No. 07/847,457, entitled *Improved Method For Loading Programs*, by Eric Straub et al., filed concurrently with this application, the disclosure of which is incorporated herein, in its entirety, by the foregoing reference thereto.

Prior to executing an application program, personal computers typically read the application program from a fixed storage medium. As examples, application programs may be stored on floppy disks, magnetic tape, the computer's hard drive, etc. To execute the program, the personal computer copies the program from the fixed storage medium into its computer memory. This allows the personal computer to execute the program very quickly since the personal computer can access its computer memory much quicker than it can access a fixed storage medium.

In accordance with the subject invention, the personal computer examines at least a portion of the image of the program for information indicating compatibility of the program with the configuration of the personal computer and, revises the image of the program if necessary to enable the program to be operable with the personal computer as configured.

One aspect of the invention is to examine the image of the program for information identifying the program. Most application programs rely upon information provided by the personal computer to determine whether the program is operable, or compatible, with the particular configuration of the personal computer. As an example, some application programs rely upon the version number of the operating system (OS) of the personal computer to determine whether the program is compatible with the personal computer. If the operating system of a particular computer configuration, or a ve operating system of the computer configuration, was not in existence at the time the application program was released, then the application program may not recognize the operating system by its version number and, therefore, will not be able to properly determine that it is compatible with the operating system. The subject invention provides a method for revising the image of the application program to accurately indicate compatibility of the application program with the operating system.

Another aspect of the invention is to examine the image of the program to determine whether the program is capable of being properly executed with the configuration of the personal computer. Since some personal computers are configured to load programs into the lowest available region of the computer's memory space, and since some programs are not capable of being operated properly from this region, a personal computer so configured must determine whether the program can be properly operated from the lowest available region of its memory space. This determination is made by examining at least a portion of the program for a predetermined set of instructions. If the predetermined set of instructions are found, then the personal computer determines that the program is not capable of being executed properly and revises the image of the program so that the program is operable with the configuration of the subject personal computer.

A presently preferred embodiment of the invention is illustrated in FIG. 1. The personal computer reads the program from the fixed storage medium, step 100 (FIG. 1). The program read from the fixed storage medium is stored in the memory space of the personal computer, thereby creating an image of the program stored on the fixed storage medium. The personal computer then examines the program image, step 102, for information identifying the program to determine whether the program recognizes the configuration of the personal computer, step 104. If the program does not recognize the configuration of the personal computer, then the program will not be able to determine that it is compatible with the configuration of the personal computer and will not execute properly. Accordingly, the personal computer will revise the image of the program, step 106, so that the program will recognize the configuration of the personal computer and will therefore be capable of proper execution with the personal computer configuration.

In addition to determining whether the program is compatible with the operating system of the personal computer, the personal computer also determines whether the program is operable from the lowest available region of the computer's memory space, step 105. As will be discussed in more detail below, one method of determining whether the personal computer is operable from the lowest available region of the computer's memory space is to examine the image of the program for a predetermined set of instructions. If the program is not operable from the lowest available region of the computer's memory space, then the image of the program is revised, step 110, so that it can be operated from substantially anywhere in the computer's memory.

Figure 2:
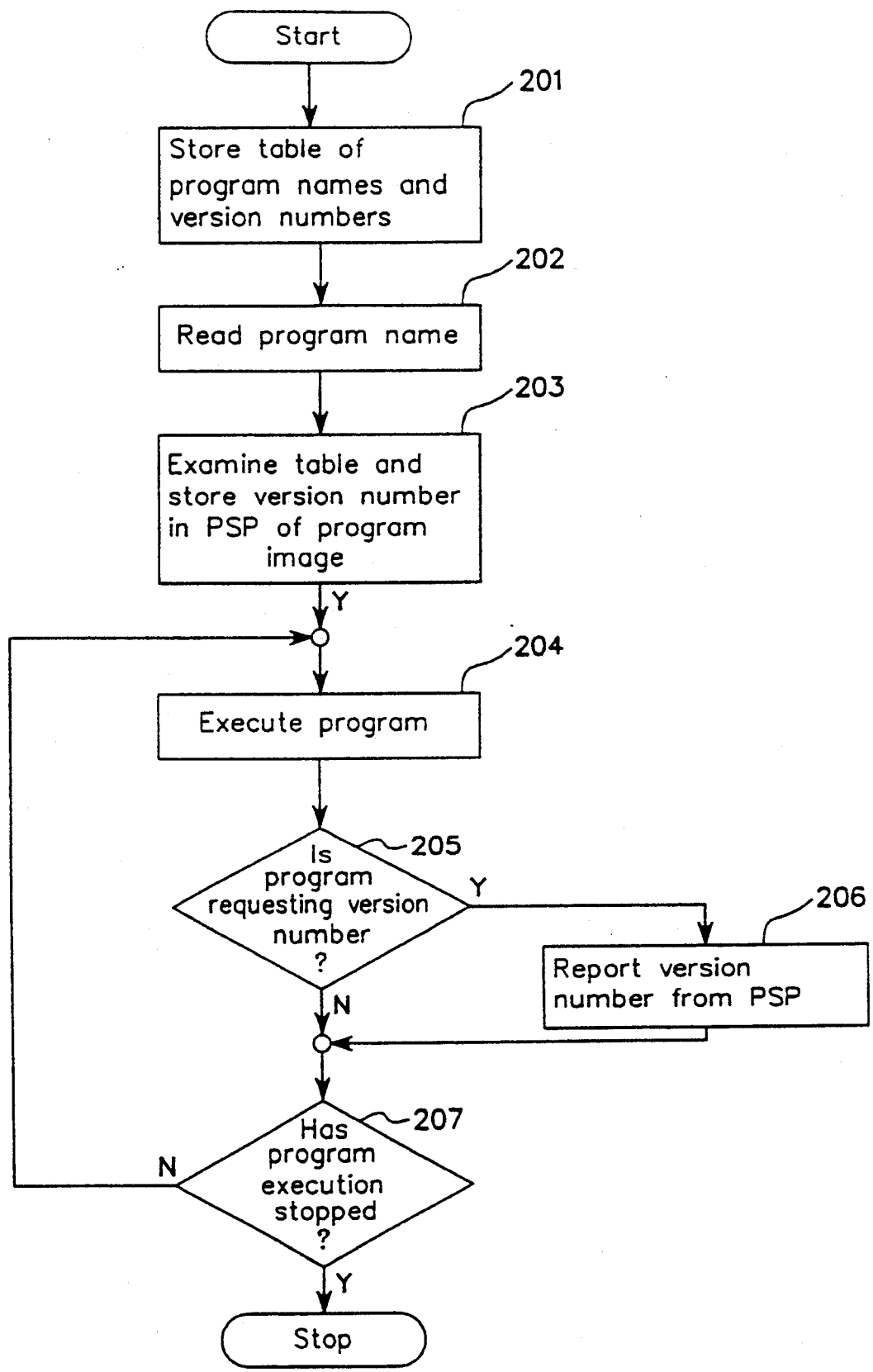
FIG. 2 is a decision flow diagram illustrating the method for storing version numbers so that old programs are operable with new operating systems.

With reference to FIG. 2, a more detailed description of the method for revising the image of the program to indicate compatibility with the operating system of the personal computer will be described. Initially, a table of program names and version numbers is stored in the personal computer, step 201. Preferably, the storage of the table referred to step 201 is done when the personal computer is first configured or designed, however, the table may be stored, or revised, at any time. The table is an index of program names and version numbers of operating systems that indicate compatibility of the program with the operating system of the personal computer. In a presently preferred embodiment of the invention, the personal computer is configured with DOS version 5. The table will contain the names of programs and prior version numbers of DOS with which the program is compatible. Those skilled in the art will recognize, however, that a wide variety of information may be stored in the table to identify the application programs and to associate the application programs with information to indicate compatibility of the application program with the configuration of the personal computer.

After the program is loaded into the memory space of the personal computer, as described above by reference to step 100 of FIG. 1, the personal computer reads the name of the program, step 202. In the embodiment of the invention described herein, the name of the program is the information used by the personal computer to identify the program and determine whether the program will recognize the operating system of the personal computer, however, other information could be used for this purpose. Thereafter, the personal computer references the table to obtain the version number associated with the name of the program and stores this version number in the program segment prefix (PSP) of the image of the program, step 203.

The image of the program is now revised so that the program will be compatible with the configuration of the personal computer. The program may then be executed in accordance with steps 204–207. During execution of the program, step 204, the personal computer determines whether the program is requesting the version number of the operating system, step 205, and, if so, reports the version number stored in the program segment prefix (PSP) of the image of the program, step 206. In this manner, the information provided to the program will properly indicate its compatibility with the configuration of the personal computer. The program execution continues in its normal manner, step 207.

It will be apparent to those skilled in the art that the table described above need not store compatibility information for programs that recognize the configuration of the personal computer. Further, some programs will not be compatible with the personal computer as configured. Accordingly, the table described above by reference to step 201 only contains the names, and compatible version numbers, for programs that are compatible with the configuration of the personal computer but may not recognize their compatibility by the version number. For all other programs, the actual version number of the operating system is stored in the program segment prefix, i.e., DOS 5 in the embodiment of the invention discussed above.

With reference to FIG. 3, a more detailed description of the method for revising the image of the program so that the program can be properly executed with the configuration of the personal computer will be described. Generally, the subject method is provided for revising programs that are not operable with personal computers constructed to store the image of the program in the lowest available region of the computer's memory space. Two types of programs are currently known to include instructions and/or data that make the program inoperable when stored in the lowest available region of the computer's memory space, i.e., EX-EPACKed programs and programs that use the Rational DOS Extenders.

Accordingly, the subject method determines whether the program is EXEPACKed, step 301, and, if so, examines the image of the program for a first predetermined set of instructions and data and replaces the first predetermined set of instructions and data with a first alternate set of instructions and data, step 302. The first set of instructions and data are those that render the program inoperable when stored in the lowest available region of the computer's memory space. The first alternate set of instructions and data are selected to perform the same function as the first set of instructions and data are designed to do when the program is stored in the upper region of the computer's memory space.

Similarly, the method determines whether the program uses the Rational DOS Extenders, step 304, and, if so, examines the image of the program for a second predetermined set of instructions and data and replaces the second predetermined set of instructions and data with a second alternate set of instructions and data, step 305. The second set of instructions and data are those that render a program that uses the Rational DOS Extenders inoperable when stored in the lowest available region of the computer's memory space. The second alternate set of instructions and data are selected to perform the same function as the second set of instructions and data are designed to do when the program is stored in the upper region of the computer's memory space.

It will be apparent to those skilled in the art that the method of replacing a predetermined set of instructions and/or data with an alternate set of instructions and/or data so that the program will be operable with the configuration of the personal computer may be used to revise the image of a wide variety of programs to cure problems of apparent incompatibility of the program with the personal computer. Further, those skilled in the art will recognize that in accordance with this portion of the subject method, it is not important that the personal computer recognize any particular program but, instead, that the personal computer recognize the set of instructions and/or data that needs to be replaced.

Those skilled in the art will recognize that although the invention has been described herein as a method for revising an application program so that the application program will be compatible with a particular configuration of a personal computer, the method does not strictly speaking revise the program. Instead, the image of the program that is stored in the computer's memory is revised so that the program will operate properly from that image. The program as stored on the non-volatile media remains unchanged.

Further, along these lines, in the case of revising the image of the application program to indicate compatibility of the application program with the configuration of a personal computer, the portion of the image that is revised is that portion that is created by the operating system during the load process to describe the application program and its operation. Accordingly, the subject invention comprises an method for revising both the executable portion of an image of an application program and the descriptive portion of an image of an application program.

It will be apparent to those skilled in the art that although only several presently preferred embodiments of the invention have been described in detail herein, many modifications and variations may be provided without departing from the true scope and spirit of the invention. Accordingly, the invention is not limited except as by the appended claims.

What is claimed is:

1. In a data processing system having a storage for storing computer programs, including an installed version of an operating system and at least one application program that knows it is compatible with a second version of the operating system that differs from the installed version of the operating system, and a processor for running the computer programs, a computer implemented method comprising the steps of:

reporting the second version as the version of the operating system that is installed to the application program so that the application program believes it is compatible with the version of the operating system that is installed; and running the application program on the processor.

2. The method of claim 1 wherein the application program includes a header for storing an indicator of the version of the operating system that is installed and said method further comprising the step of storing an indicator that the second version of the operating system is installed.

3. The method of claim 2 wherein the header is a program segment prefix.

4. The method of claim 1 wherein the storage stores multiple application programs and the method further comprises the step of maintaining a table in the storage having an entry for at least one of the application programs that is run on the processor, wherein each entry is associated with a corresponding one of the application programs and each entry specifies a version of the operating system to be reported to the corresponding application program.

5. The method of claim 4 further comprising the step of accessing an entry in the table to determine which version of the operating system to report in the reporting step.

6. In a computer system having a storage for storing application programs and an operating system, and a processor for running the application programs and the operating system, wherein the operating system has an associated version number that reflects a version of the operating system, a computer implemented method comprising the steps of:

maintaining a registry of entries in the storage, each entry being associated with a corresponding one of the application programs and each entry holding a version number for the operating system which can be reported to the corresponding application program;

in response to the user request to load a selected one of the application programs, accessing the entries to obtain the version number of the operating system to report to the selected application program;

reporting the obtained version number of the operating system to the selected application program; and loading the selected application program to be run on the processor.

7. The method of claim 6 wherein the step of loading the selected application program comprises the steps of:

providing a header for the selected application program; and storing the reported version number of the operating system in the header of the selected application program.

8. The method of claim 7, further comprising the step of running the selected application program on the processor.

9. The method of claim 6, further comprising the step of running the selected application program on the processor.

10. A data processing system comprising a storage for storing at least one application program and an operating system, said operating system having an associated first version number that indicates a version of the operating system; and a reporting module for reporting a version number of the operating system to the application program comprising:

a version registry for holding a second version number for the operating system, that differs from the first version number, to report to the application program;

an interface for retrieving the second version number of the operating system held in the registry and reporting the second version number of the operating system to the application program so that the application program believes it is compatible with the operating system.

11. The data processing system of claim 10, further comprising an execution engine for executing the application program.

12. The data processing system of claim 10 wherein the storage stores multiple application programs and the version registry holds a separate version number of the operating system for each application program to report to the application program via the interface of the report module.

13. The data processing system of claim 10, further comprising a second interface for allowing a user to manipulate the version number stored in the version registry for the application program.

14. In a data processing system having a storage for storing application programs and a selected version of an operating system, a computer implemented method comprising the steps of:

maintaining entries in a structure held in the storage, each entry being associated with a corresponding one of the application programs and each entry holding a version number of the operating system to be reported to the corresponding application program to ensure compatibility with the operating system when the corresponding application program is run;

providing an interface that allows a user to change the version numbers stored in the entries; and in response to a request by the user, changing via the interface at least one version number stored in one of the entries.

* * * * *